H. F. BUTH.
AUTOMOBILE GLASS SCREEN CLEANER.
APPLICATION FILED APR. 22, 1909.
1,017,078.
Patented Feb. 13, 191
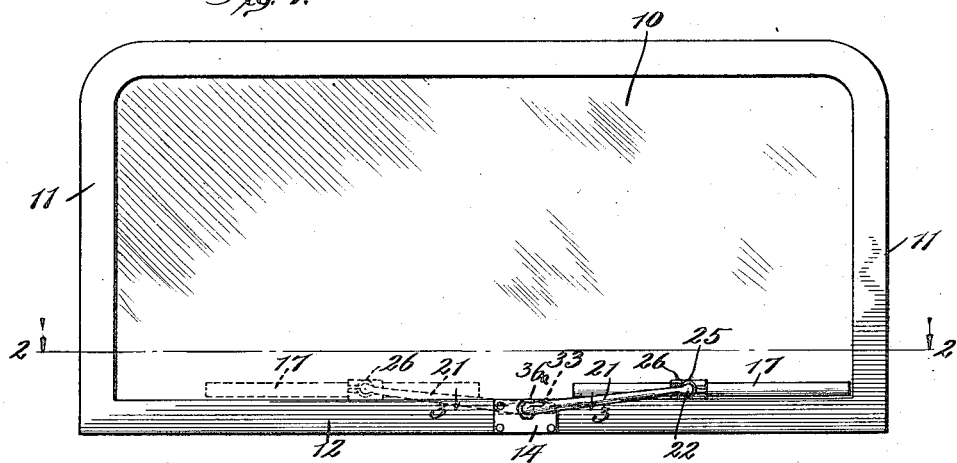
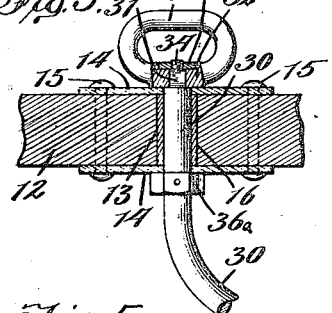
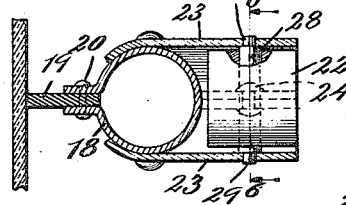
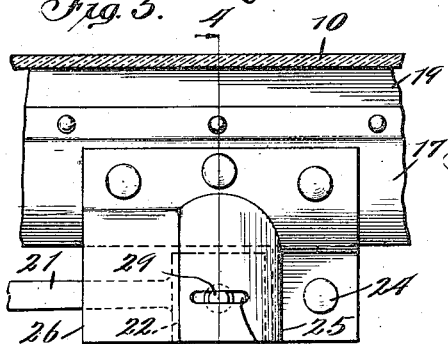
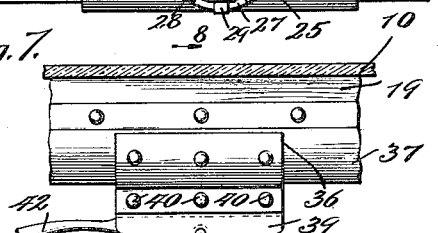

UNITED STATES PATENT OFFICE.

HENRY F. BUTH, OF CHICAGO, ILLINOIS, ASSIGNOR, BY MESNE ASSIGNMENTS, TO KIMBO CO., OF CHICAGO, ILLINOIS, A CORPORATION.

AUTOMOBILE GLASS-SCREEN CLEANER.

1,017,078.  Specification of Letters Patent.  Patented Feb. 13, 1912.

Application filed April 22, 1909. Serial No. 491,522.

*To all whom it may concern:*

Be it known that I, HENRY F. BUTH, a citizen of the United States, residing at Chicago, in the county of Cook and State of Illinois, have invented certain new and useful Improvements in Automobile Glass-Screen Cleaners, of which the following is a specification.

This invention relates to improvements in cleaners for screens or windows of automobiles, auto-boats, street cars, or other self-propelling vehicles, and one of the objects of the same is to provide an improved cleaner of this character for removing frost, condensed moisture, or dirt from the screen or window, which will be simple, durable and cheap in construction and effective and efficient in operation and which may be readily operated from the inside of the vehicle without stopping the vehicle.

A further object is to provide an improved device of this character in which the squeegee or cleaner is pivotally connected to the operating handle whereby the squeegee will assume a position against the window frame so that the view of the operator will not be obstructed.

To the attainment of these ends and the accomplishment of other new and useful objects, as will appear, the invention consists in the features of novelty in the construction, combination and arrangement of the several parts hereinafter more fully described and claimed and shown in the accompanying drawing illustrating the embodiment of the invention, and in which—

Figure 1 is a view illustrating the screen of an automobile and showing a cleaner applied thereto, constructed in accordance with the principles of this invention. Fig. 2 is a sectional view on line 2—2 of Fig. 1. Fig. 3 is an enlarged detail sectional view on line 3—3 of Fig. 1. Fig. 4 is a sectional view on line 4—4 of Fig. 5. Fig. 5 is an enlarged detail plan view of the connection between the operating rod or handle and the squeegee or wiper. Fig. 6 is an enlarged sectional view on line 6—6 of Fig. 4. Fig. 7 is a view similar to Fig. 5 of a modified form of the invention. Fig. 8 is a detail sectional view on line 8—8 of Fig. 7.

Referring more particularly to the drawing and in the exemplification of the invention shown in Figs. 1 to 6, the numeral 10 designates the usual transparent screen or window of an automobile having a frame 11. The lower member 12 of the frame is provided with an opening 13 passing therethrough and which is located preferably at substantially the longitudinal center of the member and adjacent the top thereof. Secured to each side of the member 12 is a plate 14 which plates are provided with apertures passing therethrough and these plates are secured to the member 12 by suitable fastening devices 15 and in such positions that the apertures therein will register with each other and also with the opening 13 through the member 12. If desired, a collar or bushing 16 may be provided which is located in the aperture 13 and between the plates 14 so as to register with the apertures in the plates.

A wiper, designated generally by the reference numeral 17 in Fig. 1 comprises a body portion 18 to which the squeegee 19, such as rubber, leather or the like, is secured in any suitable manner, as by fastening devices 20. The wiper is supported by means of a rod or member designated generally by the reference numeral 21 in Fig. 1. One extremity of this rod or member 21 is provided with an enlarged head 22 which is preferably circular in cross section and the wiper is secured to this enlarged extremity by means of a suitable clip comprising spaced plates or members 23 which are secured together as at 24 to inclose the enlarged extremity 22 of the member 21 within a housing formed by the offset portions 25. Portions of the members 23 adjacent the end 22 of the rod or member 21 are spaced from each other as at 26 to permit the extremity 22 to extend into the housing formed by the offset portions 25. The walls of the offset portion 25 are provided with slots 27 which register with each other and a pin or bolt 28 passes transversely through the enlarged extremity 22 of the rod or member 21. This pin or bolt 28 is of a length to substantially fill the space between the offset portions 25 and is provided with reduced angular extremities 29 which latter extend into and are freely movable within the slots 27. The end 30 of the rod or member 21 is deflected at substantially right angles to the extremity 22 and passes through the bearing formed by the apertures in the plates 14 and the sleeve or collar 16. The extremity of the end 30 is reduced as at 31 and projects beyond one of the plates 14. This reduced portion 31 is angular in cross section and is adapted to enter an angular recess in the portion 32 of a handle 33. A portion of the reduced extremity 31 is still further reduced as at 34 and is circular in cross section and provided with peripheral screw threads adapted to receive a nut 35, which latter may be seated within a recess in the adjacent face of the portion 32 of the handle for securing the handle to the rod or member 21. This nut may be provided with the usual wrench seats by means of which it may be adjusted. A suitable collar 36ª is also provided which surrounds the end 30 of the rod or member 21 adjacent the other plate 14 and is held against displacement of any suitable fastening device so that the end 30 of the rod or member will be held against longitudinal movement in its bearings but will permit the operator to axially rotate the end 30 in its bearings by means of the handle 31 which latter is located on the inside of the screen to oscillate the rod or member 21 and thereby move the wiper or squeegee across the outside of the screen or window.

The rod or member 21 is preferably constructed of spring metal and the tension thereof will hold the wiper in engagement with the screen, but will yield sufficiently to permit the wiper to be operated and will also act as a means for holding the wiper against vibration when the latter rests against the lower member 12 of the screen.

With this improved construction, the extremity 22 of the rod or member forms a bearing as well as a support for the wiper and when in the position shown in full lines in Fig. 1, the reduced extremities 29 of the pin or bolt 28 will move in the slots 27 of the members 23 to permit the wiper to rest flat against the upper edge of the member 12. As the wiper is moved across the window by the handle 33, and into the position shown in dotted lines in Fig. 1, the pivotal connection between the rod or member 21 and the wiper will permit the latter to rest flat against the upper edge of the member 12 on the other side of the pivotal support of the rod or member, thereby permitting the wiper to be moved over the outer face of the screen through an area of substantially 180 degrees, to wipe or clean a considerable area of the screen. When not in use, the wiper will assume a position on either side of the pivot of the rod or member 21 so that the view of the operator of the vehicle will not be obstructed.

When it is desired to remove the wiper, all that is necessary is to detach the handle 31 from the end 30 of the rod or member 21 to permit the latter to be readily removed from its bearings.

In the exemplification of the invention shown in Figs. 7 and 8, the members 36 which are secured to the wiper 37 are spaced from each other as at 38, and a pair of members 39 extend into the space and fastening devices 40 are provided for securing the parts together. The extremity 41 of the rod or member 42 extends between the spaced members 39 and said extremity is of a width slightly less than the width of the space to substantially fill the space, a pin or bolt 42ª, the body of which extends through the extremity 41 of the rod 42, is provided with reduced extremities 43, which latter extend through the members 39 and this pin or bolt serves as a pivot for connecting the wiper or squeegee about the extremity 41 of the rod or member 42.

In operation, the pivotal connection permits the squeegee or wiper to conform to any irregularities in the surface of the screen so that it will be held against the face of the screen during its entire oscillatory movement.

In order that the invention might be fully understood the details of the foregoing embodiment thereof have been thus specifically described, but

What I claim as new is:

1. In a window cleaner, the combination of a member, one end of which is journaled in and passes through the frame of the window, a handle connected with said end on one side of the window, the portion of the member on the other side of the window arching toward the window and with the end of the member standing in close proximity to the window and substantially parallel thereto, and a wiper connected intermediate its ends to the last said end of the member, and being disposed between said end and the window, said wiper resting and being held against the window by the elasticity of the member, said wiper being adapted to be moved bodily over the window.

2. The combination of a member having its ends bent toward each other to form a resilient arched body portion, one extremity of the member being passed through a window or screen, a handle on said end and on the side of the window opposite to that on which the body of the member is located, the other extremity of the member standing in close proximity to the respective face of the window, and a wiper connected with the last recited end, said wiper being disposed between the ends of the member and the window and being held in engagement with the window by the tension of the end of the member to which it is attached and which tension is exerted upon the wiper intermediate the ends of the latter said wiper being movable across the window by the operation of the said handle.

3. The combination of a member having its ends bent toward each other to form a resilient arched body portion, one extremity of the member being passed through a window or screen, a handle on said end and on the side of the window opposite to that on which the body of the member is located, the other extremity of the member standing in close proximity to the respective face of the window, and a wiper disposed between the last said end of the member and the window, means pivotally connecting the wiper with said end and at a point intermediate the ends of the wiper, said wiper being held in engagement with the window only by the tension of the end of the member to which it is attached and being movable across the window by the operation of the said handle.

4. The combination of a member, one end of which is adapted to be passed through a screen or window, a handle secured to said end, the other end of the member standing in close proximity to the opposite face of and extending in a direction across the window, a wiper supported by said other end of the member and for pivotal movement with respect to the other end of the member, and means for limiting said pivotal movement of the wiper with respect to the said member, said wiper being movable bodily across the window when the member is oscillated.

5. The combination of a member, one end of which is adapted to be passed through a screen or window, a handle secured to said end, the other end of the member standing in close proximity to the opposite face of and extending in a direction across the window, a wiper supported by said other end of the member and for pivotal movement with respect to the other end of the member, and interengaging means on the wiper and member for limiting said pivotal movement of the wiper, said wiper being movable bodily across the window when the member is oscillated.

6. In a window cleaner, the combination of a resilient rod, one end of which is journaled in the frame of the window, a handle connected to said end for oscillating the rod, and a wiper supported by and for pivotal movement with respect to the other end of the rod, means for limiting said pivotal movement of the wiper, said wiper being held in engagement with the window by the tension of the rod, and bodily movable across the window when the rod is oscillated.

7. In a window cleaner, the combination of a resilient rod, one end of which is journaled in the frame of the window, a handle connected to said end for oscillating the rod, a wiper supported by and for pivotal movement with respect to the other end of the rod, interengaging means on the rod and wiper for limiting the pivotal movement of the wiper with respect to the rod, said wiper being held in engagement with the window by the tension of the rod, and bodily movable across the window when the rod is oscillated.

8. In a window cleaner, the combination of a resilient rod, one end of which is journaled in the frame of the window, a handle connected to said end for oscillating the rod, a wiper, a pin and slot connection between the wiper and the other end of the rod for pivotally connecting the wiper to the rod, said connection serving to limit the pivotal movement of the wiper with respect to the rod, said wiper being held in engagement with the window by the tension of the rod and bodily movable across the window when the rod is oscillated.

In testimony whereof I have signed my name to this specification, in the presence of two subscribing witnesses, on this 20th day of April A. D. 1909.

HENRY F. BUTH.

Witnesses:
 J. H. JOCHUM, Jr.,
 C. H. SEEM.